United States Patent
Yates

(10) Patent No.: US 9,868,526 B2
(45) Date of Patent: Jan. 16, 2018

(54) AIRBORNE DRONE DELIVERY NETWORK AND METHOD OF OPERATING SAME

(71) Applicant: W. Morrison Consulting Group, Inc., Aliso Viejo, CA (US)

(72) Inventor: William M. Yates, Aliso Viejo, CA (US)

(73) Assignee: W. Morrison Consulting Group, Inc., Aliso Viejo, CA (US)

(*) Notice: Subject to any disclaimer, the term of this patent is extended or adjusted under 35 U.S.C. 154(b) by 5 days.

(21) Appl. No.: 14/882,137

(22) Filed: Oct. 13, 2015

(65) Prior Publication Data
US 2016/0107750 A1 Apr. 21, 2016

Related U.S. Application Data

(60) Provisional application No. 62/064,363, filed on Oct. 15, 2014, provisional application No. 62/064,366, filed on Oct. 15, 2014, provisional application No. 62/187,778, filed on Jul. 1, 2015.

(51) Int. Cl.
*B64C 37/02* (2006.01)
*B64C 39/02* (2006.01)

(52) U.S. Cl.
CPC ...... *B64C 39/024* (2013.01); *B64C 2201/027* (2013.01); *B64C 2201/128* (2013.01); *B64C 2201/143* (2013.01); *B64C 2201/145* (2013.01); *B64C 2201/206* (2013.01)

(58) Field of Classification Search
CPC . B64C 39/024; B64C 39/02; B64C 2201/128; B64C 2201/123; B64C 2201/127; G05D 1/104; B64B 1/22; B64D 5/00; B64D 1/02; G08G 5/0082; G08G 5/0013; G08G 5/0069; G06Q 10/08
See application file for complete search history.

(56) References Cited

U.S. PATENT DOCUMENTS

| | | | | |
|---|---|---|---|---|
| 2,843,337 A | * | 7/1958 | Bennett | B64D 5/00 244/2 |
| 3,135,511 A | * | 6/1964 | Norman | B64D 5/00 244/136 |
| 3,891,165 A | * | 6/1975 | Day | B64D 3/00 244/137.4 |
| 4,267,987 A | * | 5/1981 | McDonnell | B64D 39/00 244/137.4 |

(Continued)

FOREIGN PATENT DOCUMENTS

| FR | 3000029 A1 | 6/2014 |
|---|---|---|
| GB | 1131535 A | 10/1968 |

(Continued)

OTHER PUBLICATIONS

Kim wt al. "Fully Autonomous Vision-Based Net-Recovery Landing System for a Fixed-Wing UAV", 2013.*

(Continued)

*Primary Examiner* — Assres H Woldemaryam
(74) *Attorney, Agent, or Firm* — Dentons US LLP

(57) ABSTRACT

An airborne drone delivery network and method of operating same that provides an effective system to deliver items to a set number of delivery locations using drones in which the drone flight path is minimized and wherein the drones may be easily retrieved and reused for delivery of additional items.

20 Claims, 6 Drawing Sheets

(56) References Cited

U.S. PATENT DOCUMENTS

| | | | |
|---|---|---|---|
| 4,757,959 A * | 7/1988 | Schroder | B64D 3/00 244/137.4 |
| 5,000,398 A * | 3/1991 | Rashev | B64D 5/00 244/110 E |
| 5,311,973 A | 5/1994 | Tseng et al. | |
| 6,540,179 B2 | 4/2003 | Henderson | |
| 6,604,711 B1 | 8/2003 | Stevens et al. | |
| 6,819,982 B2 | 11/2004 | Doane | |
| 6,889,942 B2 | 5/2005 | Preston | |
| 6,942,177 B1 * | 9/2005 | Marcaccio | B64D 1/22 244/1 A |
| 7,318,564 B1 | 1/2008 | Marshall | |
| 7,714,536 B1 | 5/2010 | Silberg et al. | |
| 7,798,449 B2 | 9/2010 | Small et al. | |
| 7,967,238 B2 * | 6/2011 | Fuchs | B64C 37/02 244/2 |
| 8,056,860 B2 | 11/2011 | Small et al. | |
| 8,540,183 B2 | 9/2013 | Morris et al. | |
| 8,639,395 B2 | 1/2014 | Hudson | |
| 8,857,754 B2 * | 10/2014 | Ferrari | B64D 1/22 244/110 R |
| 8,950,698 B1 | 2/2015 | Rossi | B64C 37/02 244/2 |
| 9,043,106 B2 | 5/2015 | Ingram et al. | |
| 9,340,299 B2 | 5/2016 | Yates et al. | |
| 9,359,075 B1 * | 6/2016 | von Flotow | B64D 5/00 |
| 2002/0074454 A1 | 6/2002 | Henderson | |
| 2002/0190162 A1 | 12/2002 | McDonnell | |
| 2004/0102876 A1 | 5/2004 | Doane | |
| 2006/0000949 A1 | 1/2006 | Schroeder | |
| 2006/0000950 A1 | 1/2006 | von Thal et al. | |
| 2007/0023575 A1 | 2/2007 | von Thal et al. | |
| 2008/0184906 A1 | 8/2008 | Kejha | |
| 2009/0045290 A1 | 2/2009 | Small et al. | |
| 2009/0045295 A1 * | 2/2009 | Lundgren | B64C 29/0033 244/7 C |
| 2009/0294573 A1 * | 12/2009 | Wilson | B64C 39/024 244/2 |
| 2010/0025523 A1 | 2/2010 | Kutzmann et al. | |
| 2010/0213318 A1 | 8/2010 | Hudson | |
| 2010/0321011 A1 | 12/2010 | Small et al. | |
| 2011/0006151 A1 * | 1/2011 | Beard | B64C 39/028 244/3 |
| 2011/0049288 A1 * | 3/2011 | Suzuki | B64C 37/02 244/2 |
| 2011/0139928 A1 | 6/2011 | Morris et al. | |
| 2012/0091259 A1 | 4/2012 | Morris et al. | |
| 2012/0168564 A1 | 7/2012 | Feldmann et al. | |
| 2012/0234964 A1 | 9/2012 | Heppe | |
| 2013/0037650 A1 | 2/2013 | Heppe | |
| 2014/0277854 A1 * | 9/2014 | Jones | G05D 1/102 701/3 |
| 2014/0339371 A1 | 11/2014 | Yates et al. | |
| 2015/0158587 A1 * | 6/2015 | Patrick | B64C 39/024 244/137.4 |
| 2015/0314871 A1 * | 11/2015 | von Flotow | B64D 3/00 244/137.4 |
| 2015/0336677 A1 | 11/2015 | Smaoui et al. | |
| 2016/0042637 A1 * | 2/2016 | Cahill | G08B 25/10 701/3 |
| 2016/0167470 A1 * | 6/2016 | Seydoux | B60F 3/0038 244/2 |
| 2016/0214717 A1 * | 7/2016 | De Silva | B64D 5/00 |

FOREIGN PATENT DOCUMENTS

| | | |
|---|---|---|
| WO | 2014/011255 A2 | 1/2014 |
| WO | 2014011255 A2 | 1/2014 |

OTHER PUBLICATIONS

Suzuki et al. "Automatic Battery Replacement System for UAVs: Analysis and Design", 2011.*
Sonmezocak "Optimum Route Planning and Scheduling for Unmanned Aerial Vehicles", 2008.*
U.S. Appl. No. 14/882,254.
U.S. Appl. No. 15/090,571.
U.S. Appl. No. 15/198,946.
Ackerman, Evan. UAV Battery Packs Could Allow Electric Planes to Fly Forever, IEEE Spectrum, Jul. 12, 2012, HTTP://spectrum.ieee.org/automaton/robotics/industrial-robots/uav-battery-packs-could-allow-electric-planes-to-fly-forever.

* cited by examiner

AIRBORNE DRONE DELIVERY NETWORK AND METHOD OF OPERATING SAME

This application claims the benefit of U.S. Provisional Application No. 62/064,363, filed Oct. 15, 2014, U.S. Provisional Application No. 62/064,366, filed Oct. 15, 2014, and U.S. Provisional Application No. 62/187,778, filed Jul. 1, 2015, all of which are incorporated herein by reference in their entirety.

BACKGROUND OF THE INVENTION

Field of the Invention

The present invention relates to airborne drone delivery network and method of operating same.

Discussion of the Related Art

Companies such as Amazon, Google, FedEx, UPS and DHL are expressing interest in utilizing fleets of drones to deliver packages to consumers on an expedited basis from the time the order is placed to the time the goods are delivered to a business or residence.

Regulatory and safety issues as well as the limited range of state of the art drones such as helicopters, quad-copters, ducted fan and fixed winged aircraft are inhibiting the testing and adoption of such drone delivery services. The Federal Aviation Administration (FAA) currently does not allow drones to operate in the National Airspace System (NAS) without specific permissions known as Certificate of Waiver or Authorization (COAs) that are costly and time-consuming to obtain and furthermore are not guaranteed. To circumvent this, Google, for example, is conducting their drone delivery testing in Australia.

The idea of swarms of drones taking off from land and flying among manned aircraft and neighborhoods has raised concerns from regulators and from the general public alike. Even with permission from the FAA, the current flight duration of commercially available drones suitable for delivery into congested population centers and neighborhoods does not allow for a financially viable drone delivery network to operate.

To accommodate the limited range of today's drones, the operator of a drone delivery network would have to establish new distribution centers throughout neighborhoods at a cost that would negate any savings from utilizing drones. In some cases, drones could fly from current distribution locations of companies such as Amazon to reach a limited number of addresses that happen to be close by, but after reaching their delivery destination, would not have sufficient range to return to the distribution center for collection and reuse.

Accordingly, what is needed is a drone delivery network that overcomes the objections of regulators and the general public as well as allows operators to reach an expanded geographical area utilizing current distribution center locations.

SUMMARY OF THE INVENTION

Accordingly, the present invention is directed to an airborne drone delivery network and method of operating same that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for using an airborne drone to deliver a package to a delivery destination including affixing a delivery item to the drone and placing the drone inside of, or attaching it to, a mothership, flying the mothership on a route in proximity to the delivery destination, and jettisoning the drone from the mothership, wherein the drone navigates to the delivery destination.

In another aspect of the present invention, a method for using at least one airborne drone to deliver at least one package to at least one destination including affixing a package to the at least one drone and placing the at least one drone inside of, or attaching it to, a mothership, flying the mothership on a route in proximity to the at least one delivery destination, jettisoning the at least one drone from the mothership, wherein the at least one drone navigates to the at least one delivery destination, lands to deliver the at least one package and takes-off thereafter, and collecting the at least one drone mid-air.

In yet another aspect of the present invention, a method for using an airborne drone to deliver a package to a destination including affixing a package to the drone, flying the drone to the delivery destination and landing the drone, and collecting the drone from the delivery destination with a ground vehicle.

In a yet a further aspect of the present invention, a system for delivering a package to a delivery destination having one or more delivery drones with apparatus for attaching and releasing one or more packages, a mothership with an apparatus for attaching and releasing the one or more delivery drones, and a processor for calculating points along a route for the mothership to jettison the one or more delivery drones, wherein the mothership flies along the route and jettisons the one or more delivery drones as determined by the processor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

To increase the flight duration of electric airplanes such as electric delivery drones, the inventors of the present invention created a mid-air recharging technology for electric airplanes entitled "LONG RANGE ELECTRIC AIRPLANE AND METHOD OF OPERATING SAME", filed as PCT/US2013/034420 and published as WO 2014/011255 A2, which is incorporated herein by reference. One embodiment of this invention is for a UAV to be jettisoned from a mothership over a desirable location during flight. Another embodiment is for a UAV to fly up to, and rendezvous with a mothership for the purpose of making a physical connection during flight such as for mid-air recharging.

To maximize the effective range of a drone delivery system, it is necessary to minimize the flight time required for each drone in order to conserve energy from the drone's limited on-board energy source. To maximize the value of a drone delivery network to consumers, the elapsed time between when the consumer places the order and when the order is delivered must also be minimized. After delivery, the amount of time it takes for the drone to return to its distribution center is not as critical.

Figure 1:
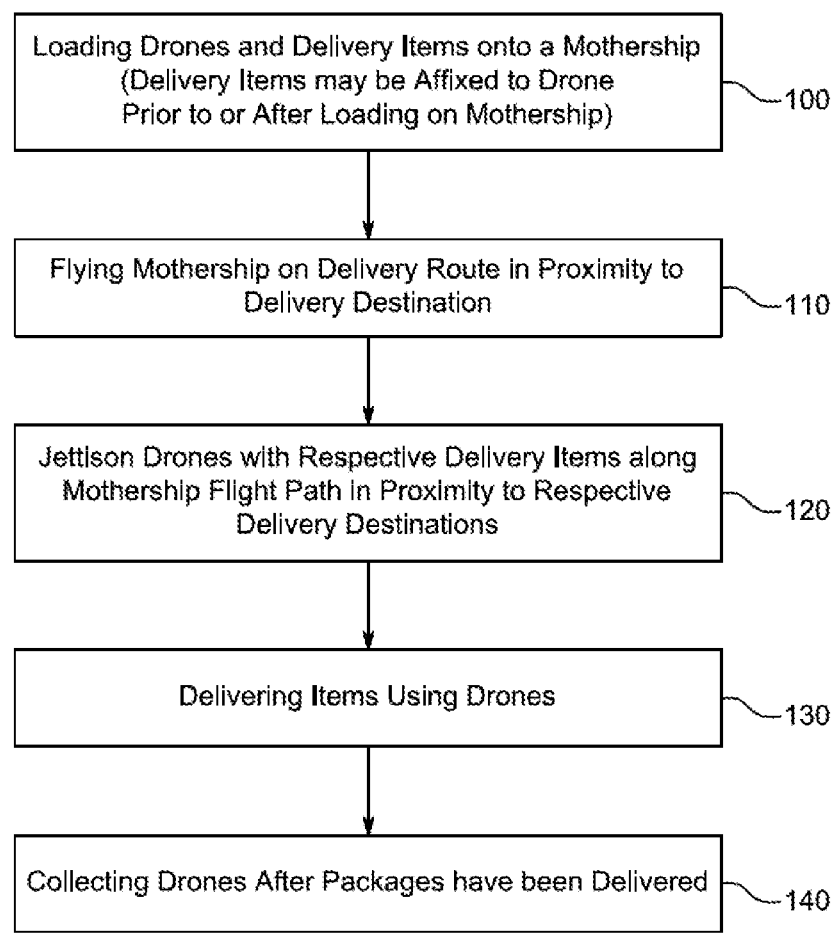
FIG. 1 is a flow chart exemplifying a delivery process in accordance with exemplary embodiments of the present invention.

FIG. 1 provides a general flow chart of exemplary embodiments of the present invention. At step 100, the mothership is loaded with one or more delivery drones and one or more delivery items. The delivery items may be paired to the delivery drones either before or after loading on the mothership. The pairing can be done manually or by automation. Once the mothership has been loaded with the appropriate delivery drones and delivery items, at step 110 the mothership begins its journey on a delivery route proximate to the one or more delivery destinations. As shown in step 120, once the mothership approaches a proximate delivery destination, it can jettison one or more drones with respective delivery items to be delivered at that destination. In exemplary embodiments drones are jettisoned at different locations along the mothership flight path based on their respective delivery destinations. In step 130 the drones complete the delivery traveling from the mothership from which they were jettisoned to the delivery destination. In exemplary embodiments the delivery destination can be a private residence. In alternative embodiments the delivery destination can be a business. In yet alternative embodiments the destination can be any particular place whether in a remote area or otherwise to where the delivery item is desired to be delivered. After delivery of the delivery item the drone can be collected at step 140. In exemplary embodiments, the drone can be discarded or left with the delivery item. In exemplary embodiments, a land vehicle or water craft can reach the drone and collect it. In yet alternative embodiments, as discussed in more detailed later, after delivery of the delivery item, the drone can fly to rendezvous with the mothership and be collected by the mothership. For example, the mothership can be controlled to fly back to a location proximate to the delivery destination and rendezvous with the returning delivery drone so as to still maintain a short flight distance for the delivery drones.

Currently, the FAA allows flight of a manned aircraft to be as low as 1,000 feet Above Ground Level (AGL) when operating over populated areas, and as low as 500 feet AGL over unpopulated areas. One embodiment of the present invention is for a conventional, manned aircraft (mothership) to depart from a distribution center carrying a quantity of delivery drones with packages attached to each drone for delivery within a certain geographical area. The mothership flies a predetermined route, optimized for delivery time and efficiency, at a low altitude such as 500 feet or 1,000 feet AGL as provided for by FAA regulations. The delivery drones are jettisoned together or sequentially from the mothership at the ideal time, place and altitude for each delivery address. The flight path of the mothership may be optimized to ensure that the release altitude and location of the drones and the subsequent flight path of the drones are in compliance with prevailing FAA regulations concerning the operation of drones in the NAS such as to navigate the mothership to an unpopulated area in proximity to the delivery addresses and to descend the mothership to a safe and legal altitude such as 500-700 feet AGL and to then release the drones at that altitude. In many areas, the FAA determination of what constitutes "controlled airspace" begins at 700 feet AGL and continues, in some cases, to 60,000 feet. The airspace from the ground up to 700 feet AGL (and in some cases up to 1200 feet AGL) is known as "Class G" airspace and it may be desirable for a person practicing the present invention to conduct drone delivery operations in Class G airspace in order to remain separated from normal air traffic operations.

The flight path of the mothership and drones may be optimized in several ways as stated above, such as for delivery time and efficiency. In some cases, it may be desirable for the mothership to fly a route optimized for efficiency, such as to fly coordinates on the outbound leg from the distribution center as directly as possible, releasing drones at the point of least distance to the delivery address for each drone. In this way, the energy used by the mothership and the drones is minimized and therefore the routing is optimized for efficiency. However, due to the irregular nature of how orders for goods may be received by the distribution center, once the mothership is loaded with drones and prepared to depart the distribution center, it may be desirable to fly in certain zig-zag patterns or to double back in a reverse direction in a manner that is optimized to deliver each drone its payload to the delivery address in order to minimize the elapsed time between order placement and order delivery on an address by address basis. This technique results in maximum customer satisfaction although may require the expenditure of more energy during flight and a more circuitous flight path than the aforementioned strategy of simply maximizing efficiency.

The flight path may be designed before departure based on the deliveries to be made. Alternatively, the flight path may be dynamically altered in real time. There are a number of factors that may affect the flight path after the mothership has already begun its journey. For example, an order change or cancellation. Other potential factors may involve weather or air traffic control limitations imposed on the aircraft that may require a detour from an initially scheduled flight path. Energy available to the mothership and/or the delivery drones may also require flight path adjustments in real time. In exemplary embodiments, the mothership will have a initially set flight path that can achieve deliveries in the most efficient manner, and also be equipped with the appropriate system to dynamically alter the preset flight path during travel if necessary. An exemplary system may include a vehicle controller with memory, a storage device, one or more central processing units, input/output devices and interfaces and a destination assurance engine, the vehicle control device being able to communicate a motor controller, optionally one or more user devices, and one or more sensors and other information gathering devices that provide the vehicle controller with the information necessary to determine whether a change in the predicted flightpath is necessary. Sensors may include energy or fuel available to the mothership, physical conditions of the mothership, weather conditions including predicted weather information that can be obtained and updated regularly through network communication as well as real time direct sensors including but not limited to air speed, pressure, wind conditions. Exemplary embodiments of such a system are disclosed in U.S. Pat. No. 9,043,106, which is hereby incorporated by reference. The mothership may use a processor or processing unit, such as a computer or flight controller, as a means for calculating points along a route for the mothership to jettison the one or more delivery drones.

After release, the drones can be equipped the appropriate sensors and flight controls to be able to orient themselves and fly down to the specific delivery coordinates as may be pre-programmed into their guidance and control systems. The delivery destination may be pre-programmed before loading the drone on the mothership. Alternatively, the destination may be updated, uploaded, or modified after the drone has been loaded on the mothership. The destination information may be sent to the drone from the mothership or from a central control station. In this way, the drones do not need to expend their scarce on-board energy supply for take-off or for flight over long distances to their destinations. In exemplary embodiments, the drones need only to use energy to descend and to perform such lateral flying as to ensure they reach their pre-programmed addresses for delivery. Upon reaching their delivery address, the drones may be designed to deliver the package. For example, the drones may land such as in the backyard of a home or the fenced off designated delivery area or roof of a business after which the consumer removes the package from the drone and either collects the drone or leaves it where it landed. In exemplary embodiments, the drones may also be designed to pick up a package or order from the consumer.

The flight controls provided to the drones may be autonomous. In exemplary embodiments, the mothership retains no control over the drones after jettisoning them. In alternative embodiments, a central processing unit on the mothership retains control over the drones. The control signals may be transmitted from the mothership to the drones via wireless communication. Each drone and the mothership may be equipped with wireless transmission equipment including transmitter and receivers. In such exemplary embodiments, the mothership can govern the location and flight pattern of each drone. This can be helpful in the event the drone is also to return to the mothership after delivery as it can easily rendezvous with the mothership. In exemplary embodiments, the mothership can track the location of the drones but not control the drones' flight paths. In yet alternative embodiments, the mothership can have the option to override the flight control of the drones and can do so only when necessary. For example, the mothership may take control over the flight controls of a drone during jettison and/or during collection of the drone.

The drones may also be able to wirelessly communicate between each other. In exemplary embodiments, each drone communicates with the mothership. In embodiments, each drone can also communicate with all other drones that were loaded on the mothership at departure. The communication between drones can be limited to simply tracking each other and thus potentially relay location of each other. Alternatively, the communication can be more extensive and flight control of one drone can be overridden by that of another drone. In exemplary embodiment, after jettisoning from the mothership the drones may continue to remain at closer proximity with each other than with the mothership. If the distance between the mothership and any one drone reaches a certain threshold the communication between mothership and drone may be lost. By maintaining communication between drones, the communication information may be transmitted from one drone to the next so that communication between mothership and drones can be maintained.

In yet alternative embodiments, the flight controls of the drones and optionally of the mothership may be controlled or overridden remotely from a central control station. The current location of each drone and of the mothership may be tracked via GPS signals. The fight control may be operated through a central processing unit located at the central control station. In exemplary embodiments, an operator may also manually take over the flight controls of the mothership and/or any one or more drones and guide the aircrafts via remote control.

In exemplary embodiments, the drones may be assisted in their orientation or descent flight operations by a variety of flight control actuators to operate flaps, spoilers and/or ailerons. In exemplary embodiments, the drones may be assisted in their descent and orientation using parachutes or thrusters, or a combination of both. In yet other exemplary embodiments, the drones may include a combination of flight control actuators and parachutes and/or thrusters. In cases where the delivery drone is carrying a heavy package that may exceed the normal payload capacity of state of the art drones, a parachute may be employed to control the descent of the drone and package. The propulsion system on-board the drone may be used to guide the parachute to the delivery destination or a thruster may be used to propel the parachuting package towards the delivery address such as by the expulsion of a compressed gas. In one embodiment, the delivery drone may take the form of a parachute in combination with a propulsion and steering apparatus. Such parachutes are known in the art of GPS steerable parachutes such as are commonly used by the military for precision cargo drop operations and are manufactured by such companies as Ballistic Recovery Systems (aka BRS Aerospace), and Airborne Systems North America. An exemplary embodiment of a steerable parachute is disclosed in U.S. Pat. No. 6,889,942, which is incorporated herein by reference. In one such embodiment, a mothership can deploy a quantity of GPS-steerable parachutes with packages or other payloads to be delivered to homes or businesses. In accordance with other aspects of the present invention, a ground vehicle may be used by the operator of a drone delivery network to collect the GPS-steerable parachutes at the end of the business day for reuse.

Since the collection of the delivery drones is not as time-critical as the package delivery phase of the network, the drones may be collected and returned to the distribution center by several methods. The operator of a drone delivery network may dispatch a ground vehicle such as a van at the end of the business day to drive a route to collect all the drones used for rapid delivery that day. The drones may be returned by the consumer to a centralized collection site for a small refund or credit. Security measures may be taken to ensure the drones are returned. In one embodiment, if the drones are moved from the delivery address location, a signal is sent by the drone's on-board GPS system to notify the operator, and the drone may be electronically disabled by such movement so as to render it worthless to a would-be thief. Alternately, the delivery recipient may be required to sign a contract prior to any such deliveries that guarantees the security of the drone or a security fee may be charged to the consumer's account in the event the drone is lost or stolen after delivery.

In one alternative embodiment to remaining at the delivery address for ground-based collection, the drones may autonomously take off after delivery and rendezvous with the mothership on its return route or on a subsequent route. In another embodiment, the drones may be programmed or controlled to fly to a rendezvous land location.

The mothership can send a signal to each drone, as it approaches the location where the drone has landed for its delivery, to signal the drone to take off and climb to a rendezvous altitude where the mothership may collect the drone in flight or connect to the drone. Alternatively, the mothership may send information to the drone about the time and place of the rendezvous. In some embodiments, the rendezvous information is pre-programmed. A GPS signal can be tracked by the mothership and/or drone to coordinate and adjust position for the rendezvous.

The mothership may then collect the drone. Various methods may be used to collect the drone. In an exemplary embodiment, the mothership may use a net to catch the drone. The net can be casted, and then retrieved into the cargo bay of the mothership. The same or different nets may be used to catch multiple drones.

Alternatively, the mothership may allow a drone to attach to the outside surface of the mothership. In such an embodiment, the drone may rendezvous with the mothership and then connect to a given location on the mothership, for example under the wings of the mothership.

In yet an alternative embodiment, the mothership may include an opening hatch through which the drone can fly and reach the cargo bay area of the mothership in which it is then safely held.

Alternatively, the mothership can collect the drone using a cable or tether as provided by co-pending application "LONG RANGE ELECTRIC AIRPLANE AND METHOD OF OPERATING SAME", filed as PCT/US2013/034420 and published as WO 2014/011255 A2, which is incorporated by reference herein.

In exemplary embodiments, a deployable cable can be used to connect the mothership to the drone being collected. The deployable cable may include a towing strength cable. The towing strength cable integrated in the cable, allows the mothership to tow or at least partially tow the drone when the connection mechanism is engaged with the drone. Any suitable material for towing may be used. In an exemplary embodiment the towing strength cable may be a steel cable. In an exemplary embodiment, the cable may include a steel cable along with other components. In one embodiment the cable further includes electrical wires or cables for positive and negative charge. The cable may also include telemetry cables, data cables, cables to download data from the mothership, cables to allow the mothership to control the drone or vice versa. The outer surface of the cable may include an abrasion resistant material.

Figure 2A:
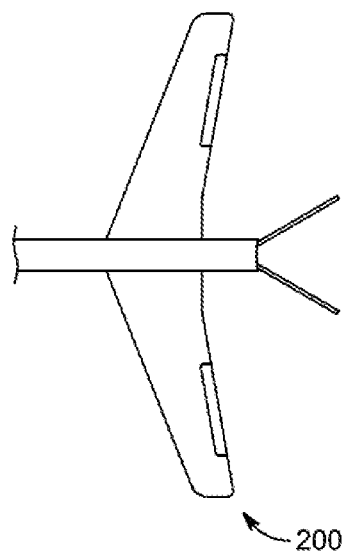
FIGS. 2(a)-2(c) provide a diagram of exemplary embodiments of a cable and connection mechanism flight control apparatus.
Figure 2B:
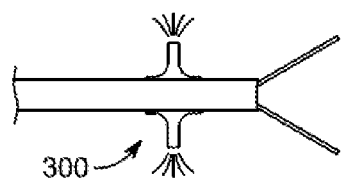
Figure 2C:
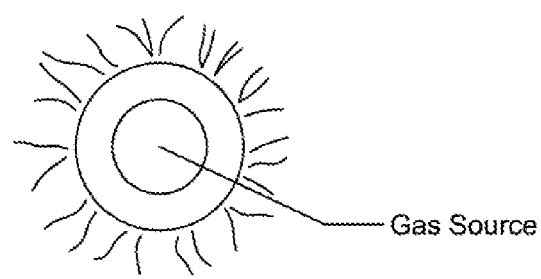

As shown in FIGS. 2(a)-(c), the cable may also be equipped with a flight control apparatus to stabilize the connecting portion and thus aid in the connection with the drone. A flight control apparatus can aid in making the connection between the mothership and the drone by affecting one or more of pitch, yaw, and roll of at least a portion of the cable. The flight control apparatus may be designed to be controlled by the mothership. In an alternative embodiment the flight control apparatus may be designed to be controlled by the drone. In yet another embodiment, the flight control apparatus may be designed to be controlled by the mothership and the drone. The controls may be automated or manual. Manual operation would require the human operation. The flight control apparatus may be controlled wirelessly. The flight control apparatus may be controlled via a cable connection provided in the cable. In one embodiment, the flight control apparatus operates autonomously. The flight control apparatus may also be a design that provides aerodynamic stability to at least at portion of the cable. The flight control apparatus may be adjusted based on movements of the mothership. The flight control apparatus may be adjusted based on movements of the charging aircraft. The flight control apparatus may be further be adjusted based on signals received by one or more sensors provided on the mothership, the drone, the cable, or any combination thereof. As shown in FIG. 2(a) the flight control apparatus may include one or more wings 200. The wings may be provided with controllable features such as ailerons, flaps, elevator, and/or rudder. These controllable features may be operated by hydraulics, electrically, using electromagnets or electric mechanism actuators. Hydraulics and/or electrical signals to operate mechanical controls of flight control apparatus may be provided through a line integrated in the cable. The wings may be designed to provide aerodynamic stability. In an exemplary embodiment shown in FIGS. 2(b)-(c) the flight control apparatus may include one or more thrusters 300. The flight control apparatus may also include CO2 canisters. As shown, for example, in FIGS. 2(b)-(c) the thruster can emit gas through nozzles positioned 360 degrees around the cable to control the position of the cable and of the connection mechanism. CO2 or other compressed gas to operate the thruster or canisters may be supplied to the flight control apparatus via a gas line that may be incorporated in the cable. In exemplary embodiments, the flight control apparatus may include a combination of one or more wings and one or more thrusters. Also, in exemplary embodiments, the flight control apparatus is located proximal to an end of the cable where a connection mechanism is located. In exemplary embodiments, the flight control apparatus is integrated with the connection mechanism. In yet another embodiment the flight control apparatus is located along the length of the cable.

The cable may be of a fixed length and mechanically connected to the drone so that it remains at its fixed length when deployed. Alternatively, the cable may be deployed using a reeling device such as a winch. The reeling device may include gear assemblies and can be powered by electric, hydraulic, pneumatic or internal combustion drives. The reeling device may also include a solenoid brake and/or a mechanical brake or ratchet and pawl device that prevents it from unwinding unless the pawl is retracted. Once connected, the towing cable may be reeled in to bring the drone inside the cargo bay of the mothership or close to an outside portion of the mothership to which the drone can attach.

Figure 3A:
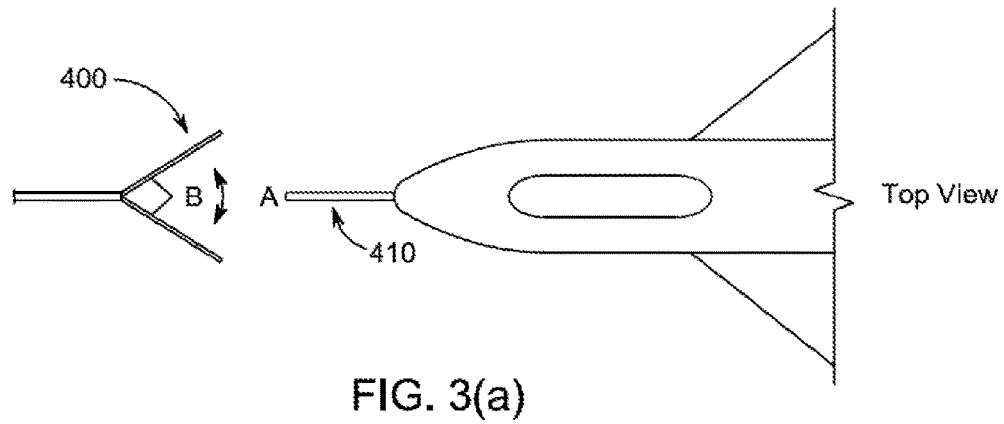
FIGS. 3(a)-3(b) provide a diagram of exemplary embodiments of a connection mechanism.
Figure 3B:
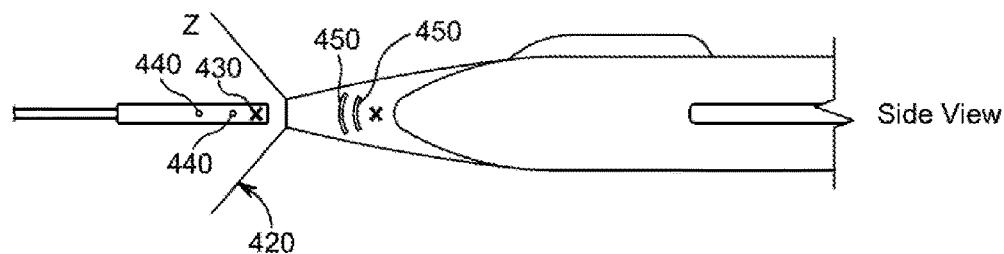

In an exemplary embodiments shown in FIGS. 3(a)-(b) the connection mechanism may include a boomerang design or "V" shaped clamp 400. The connection mechanism may have a boomerang design or V-shaped clamp that may be designed to trigger only when closing in or upon contact. The connection mechanism may include a latch 430 to lock down the connection. When triggered the connection mechanism locks into position. Upon locking the connection mechanism may also establish an electrical connection and/or fuel connection. In an exemplary embodiment, clamp 400 may include positive and negative contacts 440 that can connect to a recharging arching contacts 450 located on the drone. In this manner the mothership can provide additional charge to the drone in the event the drone requires additional charge for prolonged flight and/or additional deliveries. Alternatively, the electrical or fuel connection between the mothership and drone can be used to transfer any or all of the remaining charge or fuel from the drone to the mothership to ensure that the mothership has sufficient energy and/or fuel to reach its destination. The connection mechanism, or latch thereon, may be triggered to make the connection using a gas, for example $CO_2$. Alternatively the connection mechanism, or latch thereon, may be triggered using a spring, hydraulic, electrical actuator, electromagnet, or other suitable device. A mechanical connection may also be achieved magnetically. The drone may be equipped with a reciprocal engagement mechanism such as a blade 410 that is able to connect to connection mechanism. The blade may include guide wires 420 that also form a "V" shaped outline. The V-shaped engagement mechanism may be designed to snap shut onto a blade provided on the drone. A mechanical latch may be provided and designed to allow in flight pivoting of the contacts along the arcing contacts.

Also, while the embodiment has been described as the mothership having a cable and the drone having a blade, it should be understood that the converse may also be implemented where the drone is equipped with a cable mechanically connected to the drone and the mothership is equipped with a blade to allow for connection by the connection mechanism at the distal end of the deployable cable.

Once attached to or inside the mothership, the drone may be reloaded with a new delivery package, have its on-board energy source replenished and be re-jettisoned by the mothership for additional deliveries on the same or on a subsequent mission flight of the mothership. For example, the delivery drone may remain at its initial delivery destination for a period of time, during which time the mothership returns to the distribution center to take on new orders for delivery. Upon departing the distribution center with such new orders, the mothership may send command signals to one or more delivery drones to initiate them to take off and climb to rendezvous with the mothership to receive a new package for delivery as well as replenishment of the drone's on-board energy stores. In this way, a smaller fleet of drones may be utilized to perform a larger number of deliveries over a larger geographic area.

The mothership may also be an unmanned aircraft. An unmanned aircraft may be fixed-wing or rotorcraft. It may be powered by gasoline or other fossil fuel or it may be electric or hybrid powered. The unmanned aircraft may also be a powered motor glider such as parachute or glider with a method of providing thrust or propulsion. Steerable parachutes also known as GPS-steerable or GPS-guided parachutes may be used and defined as unmanned aircraft for the purpose of describing the present invention. The particular design of the aircraft should not be viewed as limiting. Any known design can be used or adapted to be used with the present invention. In exemplary embodiments, the mothership may be a fixed-wing aircraft which typically have greater payload and range capabilities than helicopter-style unmanned aircrafts such as quad-copters and the like. In one embodiment, an unmanned, fixed-wing aircraft is configured to carry one or more helicopter-style drones such as quad-copters, each carrying a payload for delivery to a discreet address. Many unmanned fixed-wing aircraft are able to be either hand-launched, catapult-launched, or may take-off conventionally from short paved areas. This flexibility in take-off method is beneficial to operations from distribution centers where it is impracticable for conventional gasoline powered, manned aircraft to take-off. A designated landing area with optional safety net may be used at the distribution center to recover the fixed-wing aircraft upon its return.

In one embodiment, an exemplary unmanned aircraft to be used as the mothership can be one that is manufactured by a company called "UAV Factory", which currently sells a fixed-wing, unmanned aircraft called the "Penguin B" capable of carrying a 25 pound payload and with an endurance of 20 hours of flight time, which could be utilized by a person practicing the present invention.

The term "drone" is used herein to also describe an unmanned aerial vehicle. For easy of reference the term drone is used to refer to the unmanned aerial vehicles carried and/or distributed by the mothership. A drone has many of the same features described above with respect to the unmanned aircraft that may be used for the mothership. It should be understood, however, that the size of the package carrying drones that are delivered by the mothership are typically smaller than the mothership. A drone may be fixed-wing or rotorcraft. It may be powered by gasoline or other fossil fuel or it may be electric or hybrid powered. A drone may also be a powered motor glider such as parachute or glider with a method of providing thrust or propulsion. Steerable parachutes also known as GPS-steerable or GPS-guided parachutes may be used and defined as drones for the purpose of describing the present invention. The particular design of the drones should not be viewed as limiting. Any known drone design can be used or adapted to be used with the present invention.

Figure 4:
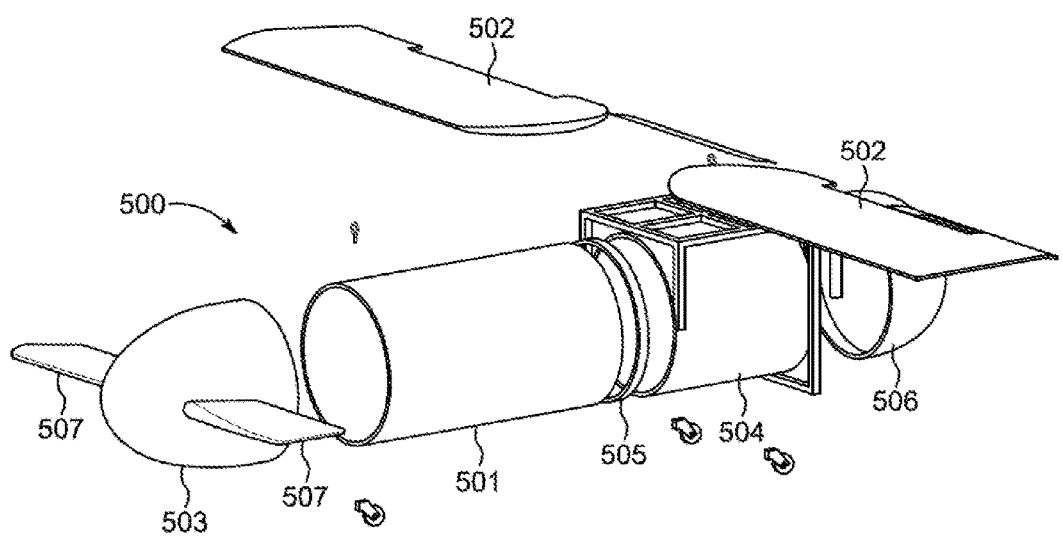
FIG. 4 is an exemplary embodiment of a motor-less delivery drone.

In exemplary embodiments, the drones may not include a motor and instead glide to their destination. In such embodiments, the drones may either be discarded after delivery or collected via ground transportation. An exploded view of an exemplary embodiment of such motor-less drone is illustrated in FIG. 4. The exemplary embodiment can include an unmanned aerial vehicle (UAV) 500, that can include a fuselage 501, a main wing system 502 that may include a cargo hold 504, an optional seal end or detachable cap 506, one or more seal or latch rings 505, a nose cone 503 with an optional canard wing system 507, a guidance system (not shown), and a flight control system (not shown). The package to be delivered can be loaded inside the fuselage 501. Upon landing or just before landing, the drone may be made to come apart to provide easy access to the package being delivered. In exemplary embodiments, the drone may be equipped with fasteners such as latches, push-to-connect fittings, bolts, straps or any combination thereof. The fasteners that can easily be undone to access the fuselage and thus the package being delivered. In exemplary embodiments, the latch may be automatically triggered upon the drone's impact with the ground. In yet an alternative embodiment, the trigger mechanism may be controlled through an positioning device, such as an altimeter, that triggers the release of the fasteners at a predetermined height from the ground. In exemplary embodiments, the drone may also include parts that fall apart upon impact with the ground, not necessarily via the use of fasteners. For example, the drone's wings may separate upon impact. The fasteners may be operated automatically using a trigger mechanism, manually or a combination thereof. The release can be performed through remote control, magnets or any other known method. The drones may be made of any suitable material such as plastic, metal, fiberglass or any combination thereof.

Additionally, quad-copter manufacturer DJI currently sells a quad-copter called the "Phantom 2" capable of carrying a light payload suitable for rapid delivery items, with an endurance of approximately 20 minutes and with GPS navigation for autonomously landing at pre-preprogrammed locations.

The Penguin B could therefore be configured as a mothership to carry several Phantom 2 quad-copter drones with delivery items attached and could be catapult launched from the roof of a distribution center to fly an optimized route over a delivery area of residential or commercial addresses in order to jettison the quad-copters at optimized times and locations after take-off.

In exemplary embodiments, drones and the mothership may include a processor. In an exemplary embodiment, the processor may be a 1 GHz 32 bit ARM Cortex A8 processor with 800 MHz video DSP TMS320DMC64x. Other processors may also be used. The drone may further include an operating system. For example, the OS may be a Linux Kernel. In a specific embodiment, the operating system includes Linux 2.6.32. The drone may also be adapted with a memory. In an exemplary embodiment the memory may be a 1 GB DDR2 RAM at 200 MHz. The drone and/or mothership may further be equipped with USB connections and wi-fi technology. In an exemplary embodiment the drone by be equipped with USB 2.0 high speed for extensions, and Wi-Fi b g n. The drone and/or mothership may further comprise flight controls such as a gyroscope, an accelerometer, a magnetometer, a pressure sensor, ultrasound sensors, and a camera. In an exemplary embodiment, the drone and/or mothership may include 3 axis gyroscope 2000°/second precision, 3 axis accelerometer +-50 mg precision, 3 axis magnetometer 6° precision, Pressure sensor +/−10 Pa precision, Ultrasound sensors for ground altitude measurement, and 60 FPS vertical QVGA camera for ground speed measurement.

The drones and/or mothership may be equipped with a flight controller designed to achieve one or more of 1) Gyro Stabilization—the ability to easily keep the copter stable and level under the pilot's control. This is a standard feature of all flight control boards; 2) Self Leveling—the ability to let go of the pitch and roll stick on the transmitter and have the copter stay level; 3) Care Free—The pilot can control the copter as if it is pointing in its original direction as the orientation of the copter changes; 4) Altitude Hold—the ability to hover a certain distance from the ground without having to manually adjust the throttle; 5) Position Hold—the ability to hover at a specific location; 6) Return Home—the ability to automatically return to the point where the copter initially took off; and 7) Waypoint Navigation—the ability to set specific points on a map that copter will follow as part of a flight plan. Exemplary flight controllers that are known in the art and may be used in the present invention include AeroQuad 32 by Carancho Engineering; the Crius All in One PRO; the Wookong by DJI Innovations; and the UAVX-Arm by QuadroUFO. These are simply illustrative examples as other flight controllers may also be used.

Flight operation for the drone and/or mothership may be achieved using one or more flight controls. As discussed above, exemplary embodiments may include drones and/or mothership equipped with motors and motor controllers. The drones and/or mothership may further be equipped with one or more propellers, thrusters, or other mechanics that allows the drone to take or maintain flight. In an exemplary embodiment the drone and/or mothership may include brushless inrunner motors. 14.5W 28,500 RPM, a Micro ball bearing, a Low noise Nylatron gears for 1/8.75 propeller reductor, a Tempered steel propeller shaft, a Self-lubricating bronze bearing, a Specific high propelled drag for great maneuverability, an 8 MIPS AVR CPU per motor controller, an Emergency stop controlled by software, a fully reprogrammable motor controller, and a Water resistant motor's electronic controller.

In an exemplary embodiment, quad-copters as discussed earlier can be mounted in any orientation to the fixed-wing mothership such as up-side-down, because such drones are commonly equipped with GPS and inertial sensors and are capable of determining and correcting platform attitude. For example, if the quad-copters are jettisoned from the unmanned Penguin B mothership or from a fast-moving conventional gasoline-powered aircraft acting as the mothership, they may tumble and become disoriented during the jettisoning process, at which time their on-board inertial system will cause their propulsion system to right itself after which the drone will follow a pre-programmed route and descent profile in order to land at the desired delivery location. Alternately, the drones may use a combination of parachute and propulsion to guide themselves to the delivery location.

In one embodiment, the drones are attached to the mothership electrically as well as mechanically. The manner in which the connection is accomplished should not be viewed as limiting. The drones can be loaded into the cargo bay of the mothership or can be attached to the outside surface of the mothership. The drones can be secured to the mothership with any apparatus for attaching and releasing the drones. Such apparatus can include clamps, dovetail connections, magnets and electromagnetic clamps, hooks, clips, buckle sliders or any combination thereof.

Figure 5:
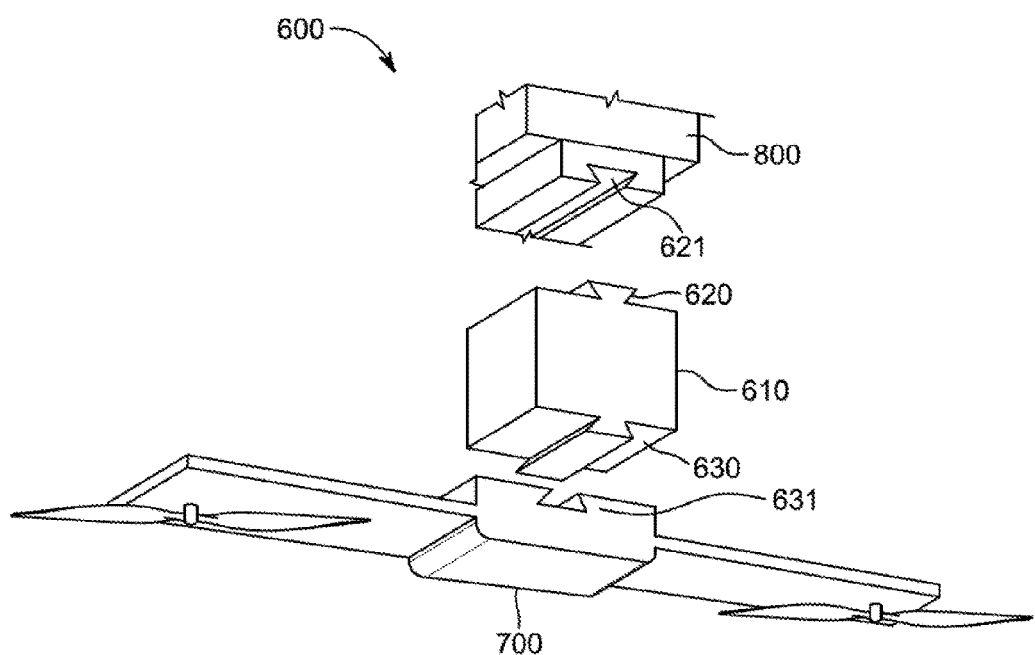
FIG. 5 shows an exemplary embodiment of an inverted drone connected to the mothership using a tote with dovetail engagements on both sides.
Figure 6A:
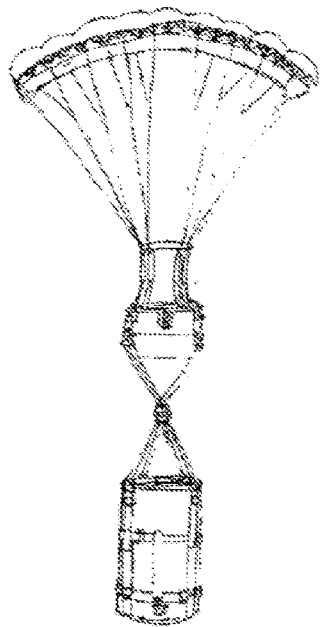
FIGS. 6(a)-6(c) show exemplary embodiments of methods of drone flight and collection.
Figure 6C:
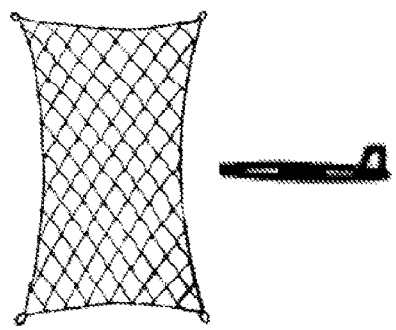
Figure 6B:
Figure 7:
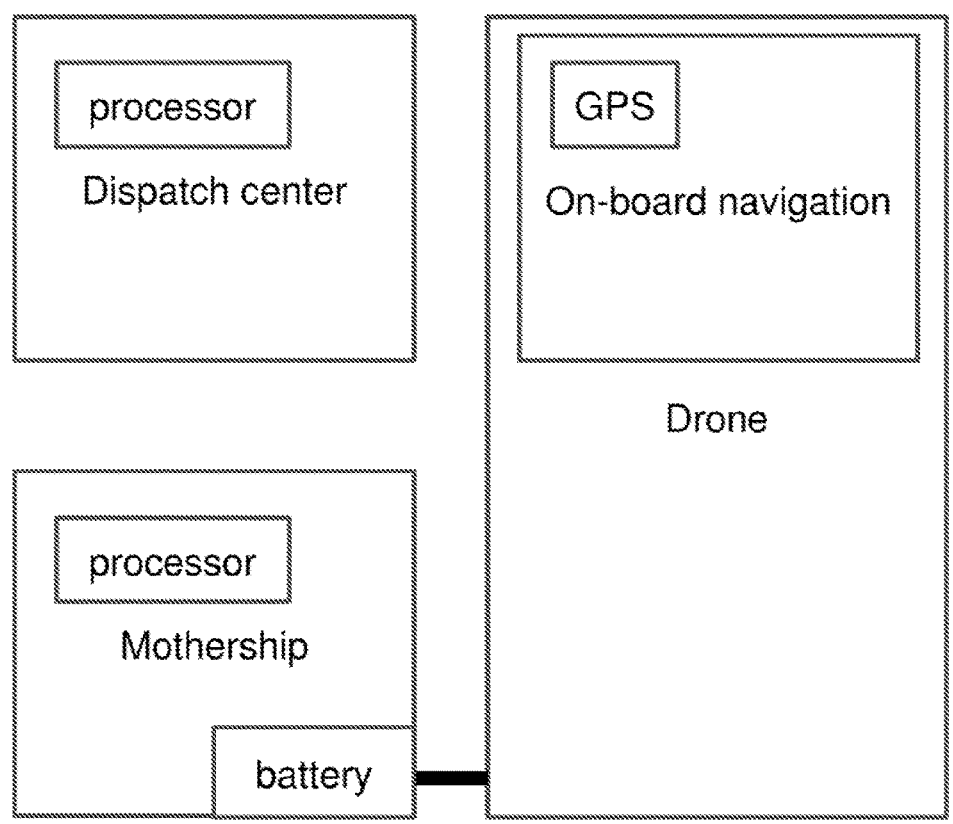
FIG. 7 shows an exemplary embodiment of system components.

In exemplary embodiments, the connection may be achieved through the use of a tote and an arrangement of dovetail connections. FIG. 5 is an exemplary illustration of this system 600. The tote 610 can be used as an apparatus for attaching and releasing or carrying and releasing one or more packages to be delivered. The tote may be equipped with either male or female dovetail engagement mechanisms 620 and 630. The mothership 800 and drones 700 can be equipped with respective engagement mechanisms 621 and 631. In exemplary embodiments shown in FIG. 5, the tote 610 has two male dovetail extensions 620 and 630 then the mothership and drones have respective female dovetail engagements 621 and 631. In embodiments, the tote may have engagement mechanism on two sides as shown in FIG. 5 such that the mothership can connect to one side and the drone to the other. Alternatively, the engagement mechanism is on both sides of the drones such that the drone is connected between the mothership and the tote. Alternatively, the dovetail engagements are only used to connect the drone to the mothership and the package is held by the drone by other means.

In exemplary embodiments, when inside the cargo bay of the mothership, the drones can connected to a movable mechanism such as a track that can rearrange the drones inside the cargo bay area. The track may be operated by gears and chains. The track may also be used to ease jettisoning the drones from the mothership. Instead of the track, other mechanisms that accomplish the rearrangement of drones may also be used. For example, a mechanical clamp or robot arm can arrange and move the drones inside the mothership or help jettisoning the drones from the mothership. Also, a conveyor belt may be used in place of a mechanical track.

The combined use of totes and dovetail engagements can also be advantageous in providing an easing exchange of packages from one drone to the next or to load a drone with a package. In exemplary embodiments, an apparatus for replacing the package to be delivered can include a tote with dovetail engagements as disclosed above. In such embodiments, a drone returning from a delivery may easily be attached to a new tote via the dovetail engagements and carry out a new delivery. The new packages can be also paired to the drones through other apparatus for replacing the package that may include mechanical means such as the use of clamps, cables, mechanical arms or combinations thereof with or without the use of totes. Also, just as easily, the packages already assigned to a drone can be swapped for a new package if it becomes necessary to do so.

Using totes as described earlier as an apparatus for attaching and releasing packages can be advantageous as different packages have different sizes making them difficult to hold and carry by the drones. However, other exemplary embodiments of an apparatus for attaching and releasing one or more packages also include clamps, straps, restricting belts, and like structures.

The drones may contain on-board energy sources such as batteries, which may connect electrically to the mothership to provide electrical power for propulsion during the time between take-off from the distribution center until reaching the jettison point for the delivery. The same mechanisms described above with respect to holding the drones attached to or inside the cargo bay of the mothership and for holding packages can be arranged to also conduct an electrical charge. Such apparatus for replacing energy of one or more drones can transfer the electrical charge between mothership and drones. In exemplary embodiments, the apparatus for replacing energy can be the tote with dovetail engagements itself by including a conductive path between the mothership and the drone. The path may be insulated so as to not transfer electricity to other objects around the tote. Other connection mechanisms to the drone as described above may also equally be equipped with an electrical pathway between the mothership and drone and thus can also act as apparatus for replacing energy. The direction of the charge transfer and when transfer of charge is desired can be governed by a processing unit on either the mothership, drone or a combination of both in which the two processing units communicate with each other, possibly wirelessly. The decision can be based on the travel time and weight of either or both the drone and mothership. Using a destination assurance algorithm as discussed earlier, the mothership and/or drone can determine the amount of energy they each will require for the remaining tasks to be accomplished. A number of rules as to how the final determination as to whether to transfer energy from one aircraft to the other can be provided as desired and should not be viewed as limiting.

The drone may be jettisoned, which eliminates the weight of the drone itself, and also the weight of the drone's on-board energy source, which may have contributed to the energy needs of the mothership. In jettisoning this weight, the mothership may then recalculate its flight plan and energy needs to optimize for the flight requirements prior to reaching its landing location, which may be back at the distribution center. Alternately, the mothership may land at another location and itself may be collected by a ground vehicle at a later time or it may land at another location owned or controlled by the distribution company operating the network.

An optimized energy plan may be achieved by a person practicing the present invention by configuring the mothership to derive its power needs, in part, from the on-board power supplies of the one or more attached delivery drones such that when each drone is jettisoned, it contains only enough remaining power to navigate to, and land at, the delivery destination.

The mothership itself can therefore contain only enough on-board energy to navigate the route and land at its intended destination taking into account the advantage of utilizing energy from the one or more attached delivery drones, during the time they are in fact attached, so that the mothership is carrying the minimum energy and weight necessary to supplement the total energy needs. In this way, the total weight of the mothership and delivery drones can be minimized on a mission by mission basis to optimize the delivery network efficiency.

The route of the mothership may also be optimized to minimize the delivery time to each delivery address, without regard for energy use. In this way, a route is calculated so that the elapsed time from order placement to delivery for each consumer is minimized. This approach results in maximum consumer satisfaction but may consume more energy than a delivery route optimized to reduce energy consumption.

The present invention has been described above in terms of a preferred embodiment and one or more alternative embodiments. Moreover, various aspects of the present invention have been described. One of ordinary skill in the art should not interpret the various aspects or embodiments as limiting in any way, but as exemplary. Clearly, other embodiments are well within the scope of the present invention. The scope the present invention will instead be determined by the appended claims.

The invention claimed is:

1. A method for using an airborne drone to deliver a package to a delivery destination comprising:
    affixing a first package to the drone and placing the drone inside of, or attaching the drone to, a mothership;
    flying the mothership on a first route in proximity to a first delivery destination;
    jettisoning the drone with the first package from the mothership,
    wherein the drone with the first package navigates to the first delivery destination and delivers the first package;
    collecting the drone mid-air by the mothership;
    after collecting the drone, flying the mothership on a second route in proximity of a second delivery destination;
    affixing a second package to the drone while inside of or attached to the mothership;
    jettisoning the drone with the second package from the mothership,
    wherein the drone with the second package navigates to the second delivery destination.

2. The method of claim 1, wherein the drone navigates to the first and second delivery destinations autonomously.

3. The method of claim 2, wherein the drone navigation is accomplished by preprogrammed GPS coordinates.

4. The method of claim 1, wherein the drone lands at the first or second delivery destination.

5. The method of claim 1, wherein the drone uses a parachute during one or more phases of flight.

6. The method of claim 1, wherein the drone uses a thruster during one of more phases of flight.

7. The method of claim 1, wherein the first or the second route of the mothership is optimized to minimize energy use for the jettisoning and collection of one or more delivery drones.

8. The method of claim 1, wherein collecting the drone comprises a step of electrically connecting the drone to the mothership; and transferring an electrical charge from the mothership to the drone before the drone is jettisoned with the second package.

9. A method for using at least one drone to deliver at least one package to at least one destination comprising:

affixing at least a first package to the at least one drone and placing the at least one drone inside of, or attaching the at least one drone to, a mothership;

flying the mothership on a first route in proximity to the at least a first delivery destination;

jettisoning the at least one drone with the at least first package from the mothership;

wherein the at least one drone navigates to the at least a first delivery destination, lands to deliver the at least first package and takes-off thereafter;

collecting the at least one drone mid-air;

affixing during flight at least a second package to the at least one drone after the at least one drone has been collected;

jettisoning the at least one drone with the second package while on a second route proximate to at least a second delivery destination, wherein the at least one drone with the second package navigates to the at least a second delivery destination.

10. The method of claim 9, wherein the at least one drone is collected mid-air by the mothership from which the at least one drone was previously jettisoned.

11. The method of claim 9, wherein the at least one drone is collected mid-air by a cable.

12. The method of claim 9, wherein the at least one drone is collected by a net.

13. The method of claim 9, further comprising transferring an electrical charge to the at least one drone after the at least one drone is collected and before the at least one drone is jettisoned with the second package.

14. A system for delivering one or more packages to a delivery destination comprising:

one or more delivery drones with apparatus for attaching and releasing one or more packages;

a mothership with an apparatus for attaching and releasing the one or more delivery drones and with mechanical means for pairing one or more packages with the one or more delivery drones;

a processor for calculating points along a route for the mothership to jettison the one or more delivery drones; and wherein the mothership flies along the route and jettisons the one or more delivery drones as determined by the processor.

15. The system of claim 14, wherein the one or more delivery drones is equipped with an on-board navigation system.

16. The system of claim 15, wherein the on-board navigation system comprises GPS.

17. The system of claim 14, wherein the processor is located on-board the mothership.

18. The system of claim 14, wherein the processor is located in a dispatch center.

19. The system of claim 14, wherein the apparatus for attaching and releasing the one or more delivery drones includes an electrical connection.

20. The system of claim 14, wherein the mothership further comprises an apparatus for replacing the energy stores of at least one delivery drone.

* * * * *